(12) United States Patent
Airola

(10) Patent No.: US 12,116,213 B2
(45) Date of Patent: Oct. 15, 2024

(54) BELT PROVIDED WITH A WEAR INDICATOR

(71) Applicant: AMMEGA ITALIA S.P.A., Mathi (IT)

(72) Inventor: Federico Airola, Mathi (IT)

(73) Assignee: AMMEGA ITALIA S.P.A., Mathi (IT)

( * ) Notice: Subject to any disclaimer, the term of this patent is extended or adjusted under 35 U.S.C. 154(b) by 0 days.

(21) Appl. No.: 18/062,284

(22) Filed: Dec. 6, 2022

(65) Prior Publication Data

US 2023/0192413 A1 Jun. 22, 2023

(30) Foreign Application Priority Data

Dec. 16, 2021 (IT) .......................... 102021000031577

(51) Int. Cl.
| | |
|---|---|
| *B65G 43/02* | (2006.01) |
| *B29D 29/08* | (2006.01) |
| *F16G 1/08* | (2006.01) |
| *F16G 1/28* | (2006.01) |

(52) U.S. Cl.
CPC ............... *B65G 43/02* (2013.01); *F16G 1/08* (2013.01); *F16G 1/28* (2013.01); *B29D 29/085* (2013.01)

(58) Field of Classification Search
CPC ........ B65G 43/02; B65G 43/04; B65G 15/30; B65G 15/32; B65G 15/34; B65G 15/42; F16G 1/28; F16G 1/00; F16G 1/06; F16G 1/08; F16G 1/10; F16G 1/26; F16G 5/00; F16G 5/04; F16G 5/06; F16G 5/08; F16G 5/20; B29D 29/06; B29D 29/08; B29D 29/085; B29D 29/10; B29D 29/103; B29D 29/106

USPC .......................................................... 474/26
See application file for complete search history.

(56) References Cited

U.S. PATENT DOCUMENTS

| | | | | |
|---|---|---|---|---|
| 4,648,856 | A | * 3/1987 | Matsunaga | ............... F16G 1/28 |
| | | | | 474/260 |
| 9,950,484 | B2 | * 4/2018 | Sakaguchi | ............. B65G 15/34 |
| 11,434,975 | B2 | * 9/2022 | Tadolini | .................... F16G 1/28 |
| 2009/0266684 | A1 | 10/2009 | Nishikita | |
| 2011/0285388 | A1 | * 11/2011 | Tomioka | ................ B29D 29/10 |
| | | | | 156/137 |
| 2016/0001512 | A1 | * 1/2016 | Sakaguchi | ............. B29D 29/06 |
| | | | | 156/60 |

(Continued)

FOREIGN PATENT DOCUMENTS

| | | | |
|---|---|---|---|
| DE | 19747173 A1 | * 4/1999 | ............... F16G 1/28 |
| DE | 19921224 A1 | 11/2000 | |

(Continued)

OTHER PUBLICATIONS

Italian Search Report and Opinion for Italian Application No. 202100031577, Jul. 15, 2022, 7 pages, Italy.

*Primary Examiner* — Michael R Mansen
*Assistant Examiner* — Raveen J Dias
(74) *Attorney, Agent, or Firm* — Gottlieb, Rackman & Rackman, PC

(57) ABSTRACT

A belt extends along a longitudinal axis and is delimited by two sides opposite one another, by a back surface and by a front surface, which is opposite the back surface, is provided with at least one tooth and is designed to cooperate in contact with a transmission wheel; the belt has at least one wear indicator defined by an element comprising ferromagnetic material, which is embedded in an intermediate portion of the tooth.

10 Claims, 3 Drawing Sheets

(56) References Cited

U.S. PATENT DOCUMENTS

2021/0054905 A1\*  2/2021  Tadolini .................... F16G 1/08

FOREIGN PATENT DOCUMENTS

| DE | 202004011502 U1 | 10/2004 | | |
|---|---|---|---|---|
| DE | 102009003763 A1 \* | 10/2010 | ............... | F16G 1/28 |
| DE | 10201726980 A1 | 10/2018 | | |
| EP | 1873088 A1 | 1/2008 | | |
| EP | 3839462 A1 | 6/2021 | | |
| IT | 202100031580 A1 \* | 6/2023 | ............... | F16G 5/00 |

\* cited by examiner

BELT PROVIDED WITH A WEAR INDICATOR

CROSS-REFERENCE TO RELATED APPLICATIONS

This patent application claims priority from Italian patent application no. 102021000031577 filed on Dec. 16, 2021 the entire disclosure of which is incorporated herein by reference.

TECHNICAL FIELD

The invention relates to a belt provided with a wear indicator.

BACKGROUND ART

Patent DE19921224 discloses a technique that allows an initial signal concerning a belt, which is obtained through magnetic induction along the entire length of the belt, to be detected and stored and, then, to be used as reference to be compared with the result of following detections, in order to determine whether there are significant differences. The presence of differences indicates that defects or breaks occurred in the belt during its use and, therefore, it needs to be replaced.

Magnetic induction detection techniques need to be applied to determine the degree of wear of a belt, in particular to progressively monitor said degree of wear during the use of the belt, for example without the need to remove the belt from the system where it is installed.

US 2009 266684 A1 corresponds to the pre-characterizing portion of claim 1 and discloses a magnet embedded in a conveyor belt. In particular, such a magnet is defined by a plate, which is embedded in a back portion of the belt, along the entire transversal width thereof.

SUMMARY OF THE INVENTION

The object of the invention is to provide a belt provided with a wear indicator, which fulfils the needs discussed above in a simple and cost-effective manner.

According to the invention, there is provided a belt provided with a wear indicator as claimed in claim 1.

BRIEF DESCRIPTION OF THE DRAWINGS

The invention will now be described with reference to the accompanying drawings, which show a non-limiting embodiment thereof, wherein.

DETAILED DESCRIPTION OF PREFERRED EMBODIMENTS OF THE INVENTION

Figure 1:
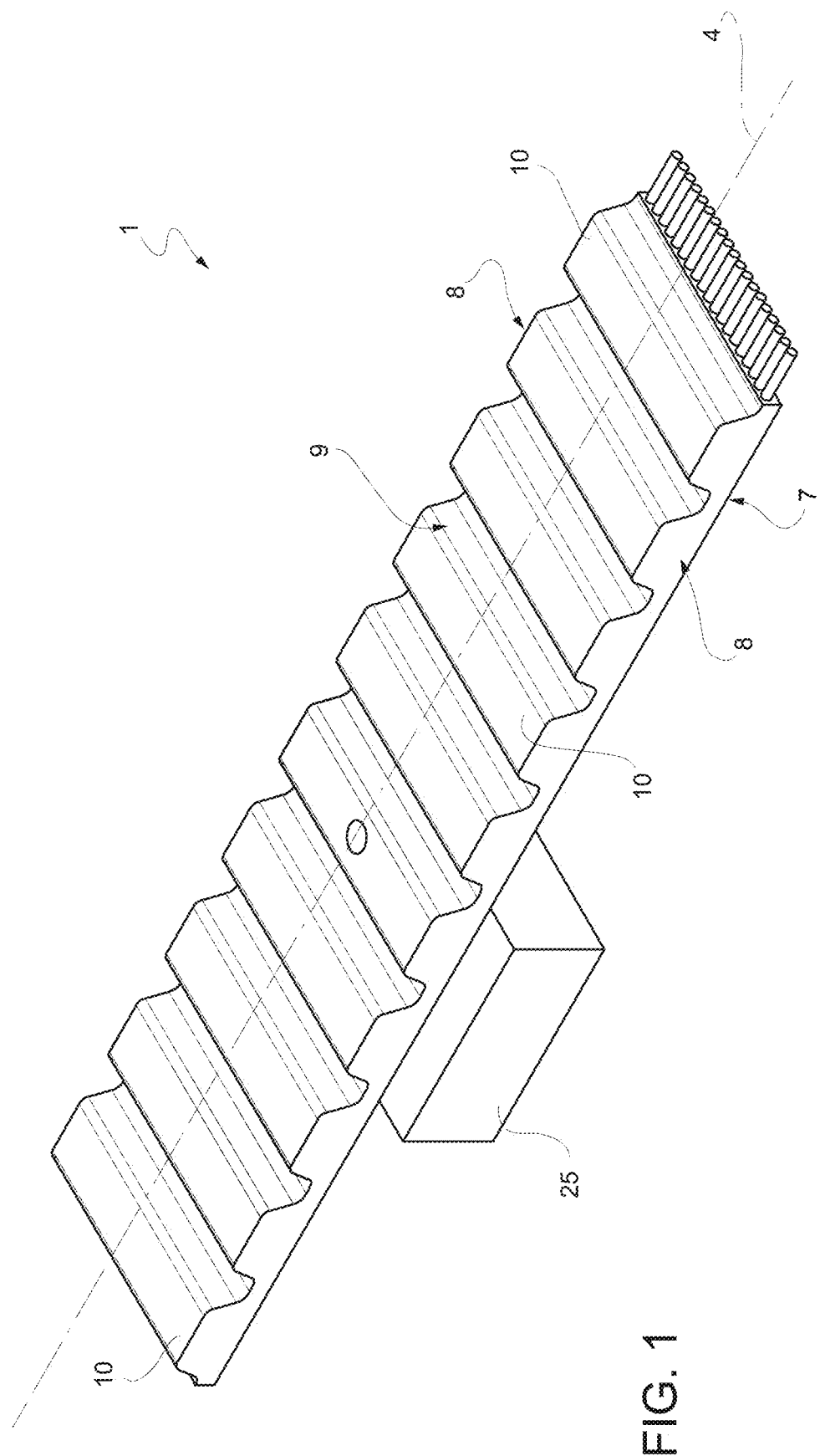
FIG. 1 is a partial perspective view of a preferred embodiment of the belt provided with a wear indicator according to the invention.

In FIG. 1, reference number 1 indicates, as a whole, a belt (partially shown), which can be used for power transmission, for conveying products, etc.

In particular, the belt 1 can form a continuous ring and, in use, is coupled to transmission wheels, namely to a driving pulley and at least one driven pulley (which are not shown).

The belt 1 extends along a longitudinal axis 4, is flexible so as to follow curved paths and is delimited by a back face 7, by two side faces 8, which are opposite one another and transverse to the face 7, and by a front dragging surface 9, which is opposite the face 7 and is designed to engage an outer side surface of the transmission wheels.

In the specific example discussed herein, the belt 1 is defined by a toothed belt, so that the surface 9 defines a plurality of teeth 10, which are parallel to one another and transverse to the axis 4.

According to variants which are not shown herein, the invention also applies to belts with trapezoid-shaped teeth parallel to the axis 4; to poly-v belts; or to belts in which the surface 9 defines one or more rows of protuberances or projections, which are spaced apart from one another and also define respective teeth.

In other words, the invention applies to belts that are provided with at least one tooth designed to engage a respective recess provided in the pulleys or transmission wheels on which the belt is wound during the use thereof.

Figure 3:
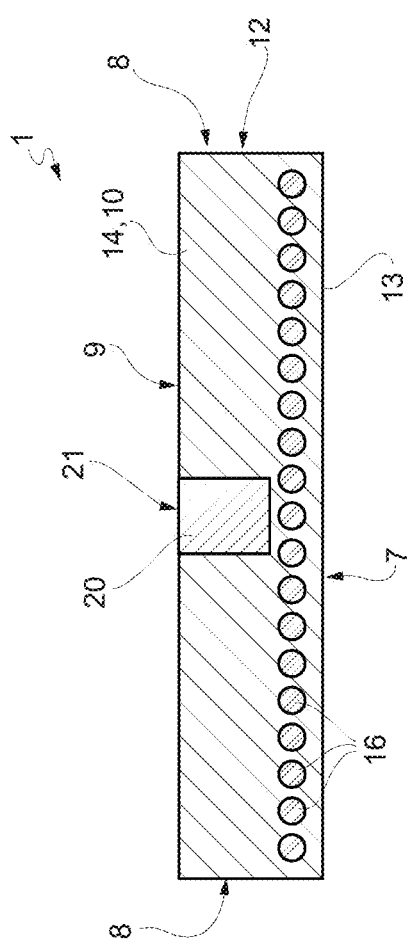
FIG. 3 is a cross section according to the section plane identified by line III-III of FIG. 2.
Figure 2:
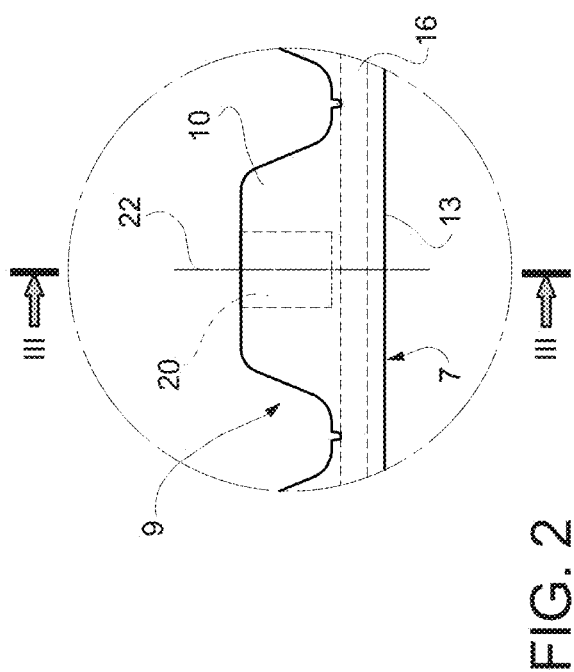
FIG. 2 is a side view, on a larger scale, of a detail of the belt of FIG. 1.

As shown in FIGS. 2 and 3, the belt 1 comprises a body 12 made of a polymer or elastomer material. The body 12 preferably consists of one single piece of polymer or elastomer material, for example polyurethane or a thermoplastic elastomer. The body 12 consists of a band-like portion 13, which has a substantially rectangular cross section, and of a projecting shaped portion 14, which includes the teeth 10.

The face 7 and the surface 9 of the belt 1 directly delimit the portions 13 and 14, respectively, of the body 12, without intermediate elements. According to alternatives which are not shown herein, the face 7 and/or the surface 9 are defined, on the contrary, by covers applied on the body 12.

The belt 1 further comprises a plurality of thread-like reinforcement inserts 16, which are usually known as "cords", are embedded in the portion 13, are parallel to the direction 4 and are made of a material resistant to tensile stress, for example steel, aramid, carbon, glass fibre or other synthetic fibres.

According to an aspect of the invention, the belt 1 comprises at least one wear indicator defined by an element 20 comprising a ferromagnetic material, namely comprising a material capable of magnetizing itself due to the action of an external magnetic field and of remaining magnetized when the field is no longer present, thus becoming a permanent magnet. According to the invention, the element 20 is embedded in one of the teeth 10 (namely, is accommodated in a seat obtained in one of the teeth 10) and is spaced apart from the two faces 8 (namely, is embedded in an intermediate portion of the corresponding tooth 10, so that the seat accommodating the element 20 has a closed perimeter, distinct from the sides 8).

The element 20 is preferably arranged in a central position between the two faces 8.

The element 20 also is preferably spaced part from the inserts 16.

In particular, the element 20 has an outer surface 21, which is arranged flush with the surface 9. According to variants which are not shown herein, the surface 21 is arranged in a recessed position relative to the surface 9, at least when the belt 1 is new, namely still has to begin its operating life; in this case, the level difference between the surfaces 9 and 21 can be defined by an empty space or can be filled by material of the portion 14 or by another material.

Figure 6:
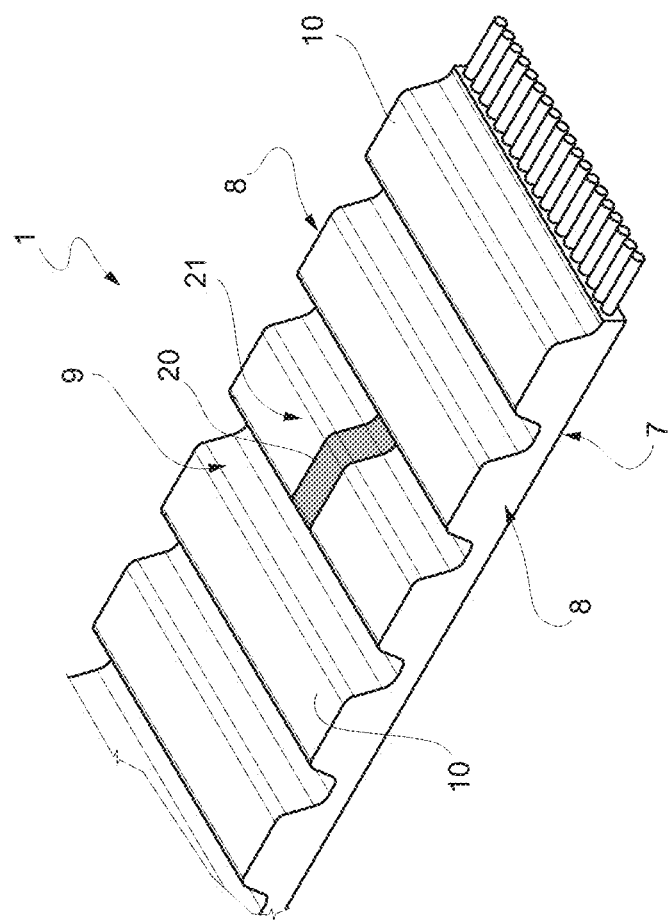
FIG. 6 relates to a variant of the belt of the preceding figures.

In particular, the element 20 extends with continuity along an axis 22, which is orthogonal to the direction 4. In other words, the element 20 does not consist of distinct pieces, so that the monitoring is continuous and not discrete. For example, the element 20 has a cylindrical shape with a circular base, but it could have a different shape, if necessary. For instance, in the variant of FIG. 6, the element 20 represents a portion of the tooth 10 arranged in an intermediate cut or slit between the side faces 8, so that its outer surface includes two inclined zones, which are opposite one another and are part, respectively, of the opposite inclined faces of the tooth 10. In this way, the reduction in the dimensions of the element 20 also is indicative of the wear of the tooth 10 along said inclined faces.

Preferably, using the surface 9 as reference, the seat engaged by the element 20 sinks along the axis 22 up to a depth that is, at most, the same as the total height of the tooth 10, so as to continuously monitor the wear during the operating life of the tooth 10, without jeopardizing the inserts 16. For example, the element 20 sinks into the tooth 10 along the axis 22 for 80% or even only 60% of the total height of the tooth 10.

According to an alternative that is not shown herein, the element 20 is arranged in the area of one of the two inclined sides of the tooth 10 (and, therefore, the axis 22 could not be orthogonal to the direction 4).

Preferably, at the beginning of its use (before being inserted and fixed in the corresponding tooth 10), the element 20 has already been magnetized, so as to define the aforesaid permanent magnet.

The elements 20 is specifically made of plastoferrite or plastoneodymium. More in general, it consists of a matrix or binder, which is made of a polymer or elastomer material, and of a ferromagnetic material, which is embedded in said matrix or binder. As preferred example, the matrix of the element 20 and the body 12 are both made of a polyurethane material and, hence, have similar features.

Generally speaking, the material of the element 20 is chosen so as to have a resistance to abrasion that does not exceed the one of the material of the portion 14 where it is embedded (and, anyway, a +10% tolerance is allowed) so as to wear with the rhythm as the tooth 10 where the element 20 is embedded, during the normal use of the belt 1.

Figure 5:
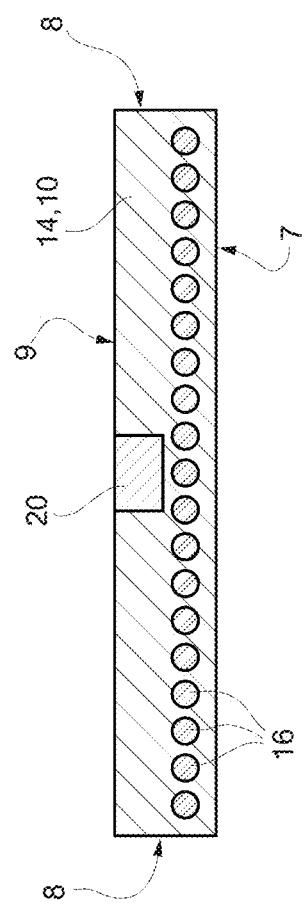
FIGS. 4 and 5 are similar to FIGS. 2 and 3, respectively, and show the worn belt after it has been used for a given amount of time.
Figure 4:
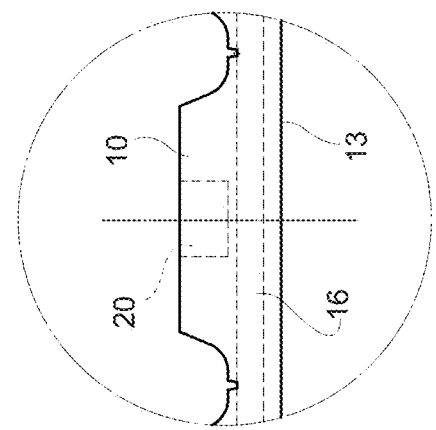

This wear generally takes place along the axis 22, as shown by the comparison of FIGS. 2 and 3, which show an initial situation, before the use of the belt 1, and FIGS. 4 and 5, which, on the other hand, show a condition in which the belt 1 is worn.

The element 20 is used as indicator of the wear of the tooth 10, thanks to known remote detection techniques, which are basically based on magnetic induction and thanks to which it is possible to estimate, for example:

the axial dimension of the element 20 (thus estimating the residual height of the tooth 10 after it has been used for a given amount of time) based on the magnetic field variation generated by the element 20 upon passing thereof close to a detection sensor 25 (partially and schematically shown), if necessary based on one or more stored reference parameters; and/or if there was an excess wear based on the difference between the magnetic field variation that was generated by the element 20 at the beginning of the operating life and the magnetic field variation that is generated by the element 20 after it has been used for a given amount of time, always upon passing thereof close to the sensor 25.

The sensor 25 is arranged in a fixed position, whereas the teeth 10 of the belt 1 move along the direction 4 during the detection. The sensor 25 is of the known kind and detects the magnetic field (or a magnetic field variation) generated by the element 20 when the latter passes close to the sensor 25: the element 20 generates a magnetic field, which is permanent and constant in itself, but is variable if observed in the area of the sensor 25, depending on the movement of the element 20 itself with the translation of the teeth 10 along the direction 4.

If the wear is estimated by comparing different detections, which are carried out at a time distance from one another, it is essential for the translation speed of the belt 1 (and, hence, of the element 20) close to the sensor 25 to always be the same for the different detections.

The distance between the sensor 25 and the teeth 10 of the belt 1 preferably is as small as possible, so that the detection has a relatively high sensitivity and, hence, is sufficiently precise even when the residual magnetization and/or the height of the element 20 are relatively small. Experimental tests could be suited to define the parameters of the detection system (distance and/or position of the sensor 25 relative to the teeth 10; height of the element 20; percentage of ferromagnetic material embedded in the matrix of the element 20, etc.).

While manufacturing the belt 1, the element 20 is coupled to the tooth 10 through fitting or pressing and, for example, remains fixed through interference. Other coupling and fixing techniques can be anyway used, for example gluing or heat sealing.

The sensor 25 is connected to a control unit, not shown, which processes the signal emitted by the sensor 25 in order to carry out the estimate indicated above. The control unit preferably compares the detected and/or estimated values with a predefined threshold, beyond which a (visual or acoustic) alarm signal is emitted so as to signal that the belt 1 needs to be replaced. If necessary, said warning can be transmitted at a distance, for example to operators responsible for the maintenance.

The sensor 25 can have configurations other than the one shown herein (for example, a ring conformation or a conformation with a C-shaped cross section, at least partly arranged around the belt 1). It is anyway essential for the distance between the teeth 10 and the sensor 25 to be small enough to allow the latter to detect a magnetic field variation as the element 20 passes by along the direction 4.

The sensor 25 can define a specific apparatus to carry out tests or, preferably, can directly and firmly be mounted on the system where the belt 1 is installed, so as to perform a direct monitoring during the use of the belt 1.

Before carrying out any detection by means of the sensor 25, according to a preferred aspect of the invention, the belt 1 is subjected to an initial demagnetization operation by means of a demagnetization apparatus available in the market, in order to eliminate a possible residual magnetization of the inserts 16, in particular if they are made of a metal material. Said residual magnetization, which is often present after the production, could cause troubles in the detection of the signal by the sensor 25.

The initial demagnetization operation is preferably carried out before inserting and fixing the element 20 in the corresponding tooth 10. Anyway, it could be carried out after having coupled the element 20, since experiments have shown that the inserts 16 can be demagnetized without eliminating the magnetization of the element 20.

Owing to the above, it is evident that the element 20 embedded in the intermediate portion of one of the teeth 10 of the belt 1 wears together with the tooth 10 and, hence, its residual height can be monitored in order to determine when the wear is too much and the belt 1 needs to be replaced. At the same time, the seat accommodating the element 20 is spaced apart from the sides 8, so that it does not excessively weaken the structure of the corresponding tooth 10.

In addition, the solution suggested herein is relatively simple to be manufactured and is reliable in terms of good results. Furthermore, a continuous monitoring can be carried out and, based on data detected at the beginning of the operating life of the belt 1, a future prediction of the wear of the element 20 and of the tooth 10 can be performed, thanks to suitable software.

Finally, owing to the above, the belt 1 described and shown herein can evidently be subjected to changes and variations that do not go beyond the scope of protection of the invention, as set forth in the appended claims.

In particular, the number, the material, the shape, the dimensions and the position of the elements 20 in the teeth 10 of the belt 1 could be different from the ones indicated above by way of preferred and non-limiting example.

For instance, more teeth 10 could be provided with the wear indicator according to the invention and/or several wear indicators could be embedded in the same tooth 10, for example in positions spaced apart from one another along the transversal width of the tooth 10 between the faces 8.

The invention claimed is:

1. A transmission belt extending along a longitudinal axis and delimited by two side faces opposite to one another, by a back surface and by a front surface, which is opposite to said back surface, the transmission belt comprising:
    a band-like portion, extending along said longitudinal axis;
    a plurality of teeth located at said front surface configured to cooperate in contact with a transmission wheel during use, and protruding from said band-like portion with a first height along an axis, which is orthogonal to said longitudinal axis;
    at least one wear indicator defined by an element, which comprises ferromagnetic material and is embedded in one of the teeth so as to be consumed together with said one of the teeth during use of the transmission belt;
    wherein said element is spaced apart from said side faces, has an outer surface arranged flush with said front surface, and extends inside said one of the teeth from said outer surface along said axis with a second height which is lower than, or equal to, said first height.

2. The transmission belt according to claim 1, wherein said element is already magnetized, before being coupled into said one of the teeth, so as to define a permanent magnet.

3. The transmission belt according to claim 1, wherein said element comprises a matrix or binder, of polymeric or elastomeric material; said ferromagnetic material being embedded in said matrix or binder.

4. The transmission belt according to claim 1, wherein said element consists of plastoferrite and/or plastoneodymium.

5. The transmission belt according to claim 1, wherein said element consists of a material having an abrasion resistance that substantially does not exceed the one of the material of said tooth.

6. The transmission belt according to claim 1, wherein said element is arranged in a central position between said side faces.

7. The transmission belt according to claim 1, wherein the transmission belt further comprises a plurality of cords, which are embedded in said band-like portion and are parallel to said longitudinal axis; and wherein said element is spaced apart from said cords.

8. The transmission belt according to claim 1, wherein said teeth are parallel to each other and have a trapezoidal-shape, in cross section.

9. The transmission belt according to claim 8, wherein the transmission belt is a timing belt.

10. A method for producing a transmission belt according to claim 1, wherein said transmission belt is subjected to an initial demagnetization operation, before detecting a magnetic field or a variation of magnetic field generated by said transmission belt.

* * * * *